Figure 4:
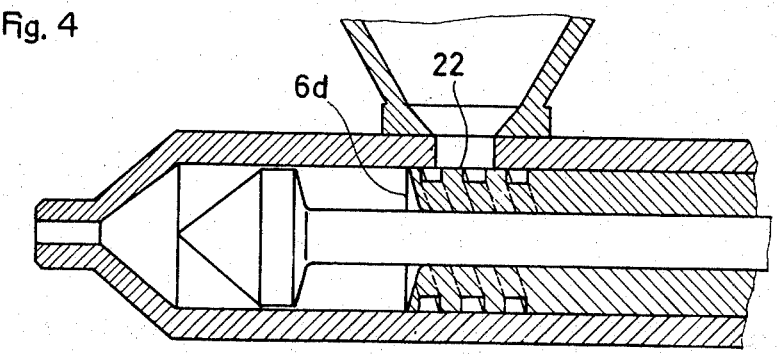

United States Patent

Hauser

[15] 3,695,575
[45] Oct. 3, 1972

[54] INJECTION MOLDING MACHINE HAVING A PLASTICIZING PLUNGER

[72] Inventor: Rudolf Martin Hauser, Zurich, Switzerland

[73] Assignee: Bucher-Guyer AG Maschinenfabrik, Niederweningen, Zurich, Switzerland

[22] Filed: June 16, 1970

[21] Appl. No.: 46,787

[30] Foreign Application Priority Data

June 18, 1969 Switzerland...............9335/69

[52] U.S. Cl....................................259/185, 425/207
[51] Int. Cl..............................................B29f 3/02
[58] Field of Search...18/30 AF, 12 C, 12 SA, 12 SC, 18/30 QM, 30 QC, 30 A, 30 QP, 30 SQ; 425/207, 200, 209

[56] References Cited

UNITED STATES PATENTS

| | | | |
|---|---|---|---|
| 2,616,130 | 11/1952 | Banz | 18/30 QC UX |
| 3,099,861 | 8/1963 | Gaspar et al. | 18/30 SQ |
| 3,021,561 | 2/1962 | Reifenhäuser | 18/12 SC X |

FOREIGN PATENTS OR APPLICATIONS

| | | | |
|---|---|---|---|
| 746,808 | 11/1962 | Canada | 18/12 C |
| 1,294,000 | 4/1962 | France | 18/30 SQ |
| 1,500,377 | 9/1967 | France | 18/30 AF |
| 1,023,900 | 3/1966 | Great Britain | 18/30 SQ |
| 1,185,366 | 1/1965 | Germany | 18/30 QC |

Primary Examiner—J. Spencer Overholser
Assistant Examiner—Michael O. Sutton
Attorney—Littlepage, Quaintance, Wray & Aisenberg

[57] ABSTRACT

An injection molding machine for processing plasticizable plastics material comprises an injection cylinder opening into an injection nozzle, and a plasticizing plunger movable in the injection cylinder towards and away from the injection nozzle. A constricted passage is provided between the plasticizing plunger and the internal wall of the injection cylinder. At the rear of the plasticizing plunger a filling plunger is provided in the injection cylinder and arranged to effect a pulsating reciprocatory movement in the injection cylinder in the range of a hopper discharge opening into the cylinder for supplying granular plastics material into the cylinder. The plasticizing plunger is provided with a plunger rod which is slidingly mounted in a coaxial bore of the filling plunger.

8 Claims, 4 Drawing Figures

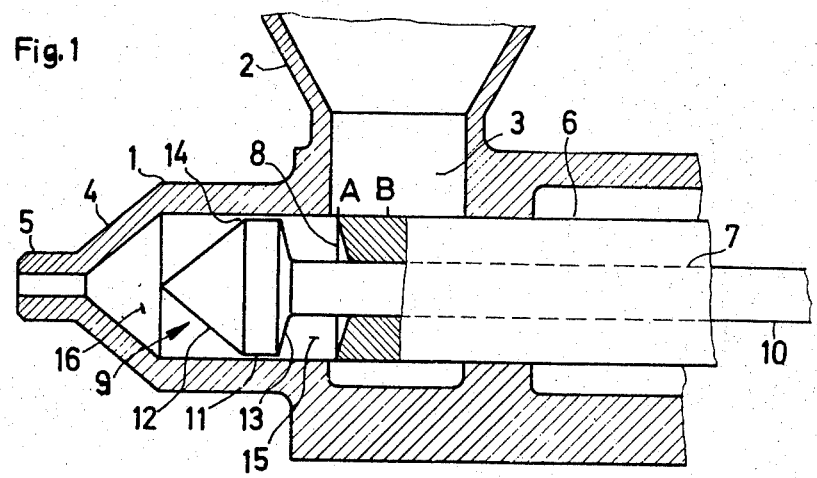
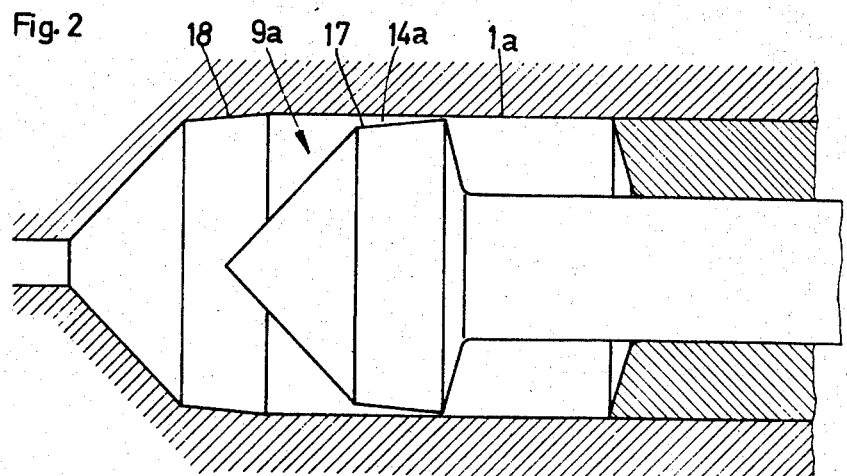
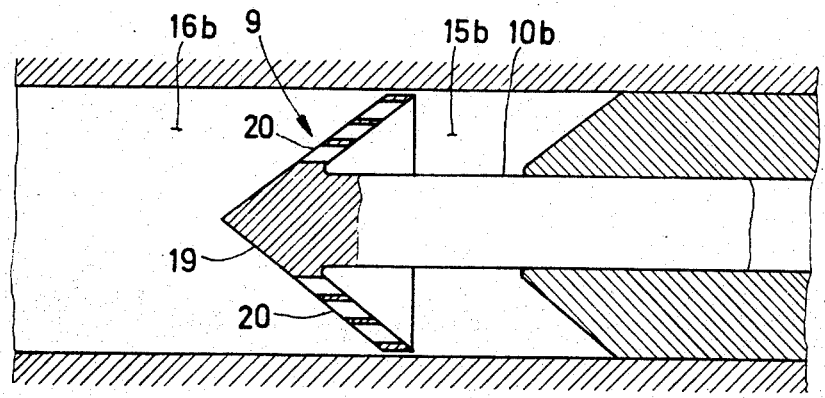

INJECTION MOLDING MACHINE HAVING A PLASTICIZING PLUNGER

The invention refers to an injection molding machine for processing of plasticizable plastics of the kind having an injection cylinder opening into an injection nozzle and a driven plasticizing plunger arranged in the injection cylinder and movable towards the injection nozzle and away from the latter.

In plunger injection molding machines mostly the plastics material to be processed is fed into the injection cylinder in preplasticized condition and dosed, the injection plunger having the task to only perform the injection.

Plunger injection molding machines have already been proposed in which the plasticizing process occurs within an injection cylinder in such manner, that the plastics material is driven through a stationary cross sectional constriction in the injection cylinder. In such injection molding machines, however, a possibility of dosing within the injection cylinder is not possible.

The object of the present invention is the provision of an injection molding machine in which this deficiency is eliminated.

The injection molding machine according to the invention comprises an injection cylinder, an injection nozzle communicating with the injection cylinder, a plasticizing plunger having front and back sides and adapted to reciprocate in the injection cylinder in a direction towards and away from said injection nozzle, a restricted passage being provided for communication between said front and rear sides of the plasticizing plunger throughout the total range of stroke thereof, a filling plunger adapted to reciprocate without clearance in said injection cylinder at the rear of the plasticizing plunger, and a plunger rod carrying said plasticizing plunger, said plunger rod being mounted in said filling plunger for longitudinal movement relative thereto.

The invention will now be described in detail with reference to the accompanying drawings, in which, FIG. 1 is a longitudinal section through the injection cylinder of an injection molding machine according to the invention, FIGS. 2 and 3 each are a longitudinal section through an injection cylinder and represent modifications of the plasticizing plunger drawn to a larger scale, FIG. 4 represents a further modification in axial section in which the filling plunger is formed as a rotatable conveying screw.

Referring to FIG. 1, a supply and feeding hopper 2 for the plastics material to be processed is mounted on an injection cylinder 1, the hopper opening into an antechamber 3.

The injection cylinder 1 tapers at its front end to form a funnel 4 which opens into an injection nozzle 5.

A filling plunger 6 is mounted for reciprocation in the circular cylindrical hollow space of the injection cylinder 1 and is provided with a coaxial bore 7 and with a recess 8 at the front end face. The plunger rod 10 of a plasticizing plunger 9 is mounted for rotation and axial movement in the bore 7 of the filling plunger. The plasticizing plunger 9 is provided with a cylindrical portion 11 which is joined at the front side by a cone 12 and at the rear side by a bevel 13. An annular gap 14 is provided between the cylindrical portion 11 and the internal wall of the injection cylinder 1.

The working method of the filling, dosing plasticizing and injection operation in the above described injection molding machine substantially is as follows:

By driving means, not represented, the filling plunger is driven to execute an axially pulsating movement through an extent A – B, a narrow open gap preferably remaining between the edge of the front side of the filling plunger 6 when this latter is at the front dead center position A and the wall of the adjacent antechamber 3. During the filling operation the plasticizing plunger 9 is in the position shown and accordingly determines the volume of the space designated as dosing space 15 at its rear side.

The non plasticized material which is capable of trickling down from the hopper 2, arrives in the dosing space 15 by the positive conveying action of the pulsating movement of the filling plunger 6, and is precompressed in this space to a predetermined adjusted pressure. When this pressure is attained the pulsating movement of the filling plunger 6 is stopped as soon as this latter arrives at the front dead center position A. The filling plunger 6 and the plasticizing plunger 9 now are displaced together forwardly with the same stroke relative to the injection cylinder 1 until the plasticizing plunger 9 with its cone 11 abuts against the funnel 4 of the injection cylinder 1. The volume of the dosing space 15 remains invariable during this common feed motion of both plungers. At this position the plasticizing plunger 9 subsequently is rotated by its plunger rod 10 and at the same time so far retracted until the bevel 13 of the plunger 9 abuts against the bottom of the recess 8 of the filling plunger. Upon this return stroke movement of the plasticizing plunger 9 the precompressed material in the dosing space 15 at the rear of the plunger is displaced through the restricted annular gap 14 into an injection chamber 16 situated in front of the plasticizing plunger 9, and by the action of pressure and friction at the bevel 13 and in the annular gap 14 is plasticized and homogenized. As soon as the plasticizing plunger 9 has attained its rear end position, the plasticizing plunger and the filling plunger are both pressed forwardly together and thereby the material in the injection chamber 16 is injected through the nozzle 5 into a mold not drawn.

Preferably, during the filling of the dosing space 15, the amplitude A – B of the pulsating motion of the filling plunger 6 is reduced towards the end of the filling operation in order to thereby obtain a more precise dosing of the shot volume. By conserving a small free annular opening at A, as a free communication between the antechamber 3 and the dosing space 15 during stuffing of the material in the space 15, any surplus material has the possibility to escape out of the dosing space 15. The precision of dosing thus is also favorably influenced.

In the described injection molding machine, the working methods can be varied. Thus, for example, during the filling operation the plasticizing plunger 9 can occupy its most forward position with the cone 12 abutting against the funnel 4 of the injection cylinder 1, whereby the dosing space 15 has its greatest possible volume. Dosing now occurs simultaneously with plasticizing, the quantity of injected material being determined by the extent of the stroke of the retracting movement of the plasticizing plunger 9. At a predetermined position of the plasticizing plunger, the movement of rotation and of retraction of the plasticizing plunger 9 is stopped and subsequently the filling plunger 6 and the plasticizing plunger 9 are pressed forwards simultaneously to inject plasticized material in the injection chamber 16 through the injection nozzle 5.

In a further modified operation of the machine plasticizing and injection can occur simultaneously in a single operation. For doing so, the plasticizing plunger 9 is brought to a position in which a small gap remains open between the cone 12 and the funnel 4 of the injection cylinder 1. After filling of the dosing space 15 the simultaneous plasticizing and injection is effected by the forward stroke of the filling plunger 6 and simultaneous rotation of the plasticizing plunger 9, the dose being determined by the extent of the working stroke of the filling plunger.

For an additional improvement of the precompression it may prove convenient to superpose a vibratory or an oscillatory movement in the frequency range up to $10^6$ hertz to the axial pulsating movement of the filling plunger 6. Also a vibration of the plasticizing plunger 9 in the high frequency range may have a favorable action in that a reduction of friction is obtained and homogenizing of the material is favored.

As a modification the plasticizing plunger 9a represented in FIG. 2 has a conical portion 17 which defines a forwardly widening annular gap with the internal wall of the injection cylinder 1a. In the most forward end position attained during the injection operation this conical portion 17 will fit with a bevel surface 18 at the end of the injection cylinder 1a. By means of this shape of the plasticizing plunger 9a and of the injection cylinder 1a it is avoided that after terminating of the injection stroke any residual material remains in the annular gap 14a.

In the embodiment of the invention illustrated by FIG. 3 the plasticizing plunger 9 comprises a cone-shaped head 19 fixed on the plunger rod 10b, which head is axially pierced by holes 20. Plasticizing here is effected by displacement of the material from the dosing space 15b through the holes 20 into the injection chamber 16b.

As shown in FIG. 6, the filling plunger 6d can also be formed with a conveyer screw 22, the filling plunger 6d is driven with a rotary motion in addition to the pulsating axial movement.

I claim:

1. An injection molding machine for processing plasticizable plastics, comprising an injection cylinder, an injection nozzle at one end of said cylinder and communicating therewith, a reciprocating filling plunger having a front end within said cylinder, a reciprocating plasticizing plunger positioned in said injection cylinder between said front end of said filling plunger and said injection nozzle having means to plasticize plastic within a dosing space between said filling plunger and said plasticizing plunger, means to feed plastic to said dosing space between said filling plunger and said plasticizing plunger, said plasticizing plunger comprising a plunger body having a front side and a back side and defining between its contour and the inside wall of said injection cylinder a restricted annular passage for plasticized plastic between the dosage space behind said back side and the space in front of said front side, said plasticizing plunger body being secured at its back side to a plunger rod of smaller outside diameter than the outside diameter of said contour of said plasticizing plunger, said plunger rod extending coaxially and displaceably through an axial bore in said filling plunger, means to move said plasticizing plunger so that said front end of said filling plunger having a front surface adapted to snugly fit the surface of said back side of said plasticizing plunger body abut after said plastic has been plasticized, and when said filling plunger abuts against said plunger body of said plasticizing plunger means to advance said plungers to inject said plasticized plastic through said injection nozzle.

2. The injection molding machine of claim 1 in which the plasticizing plunger is driven for rotation about its longitudinal axis to plasticize the plastic within the dosing space.

3. The injection molding machine of claim 1, in which the hollow space within the injection cylinder is divided by the plasticizing plunger into a dosing space and into an injection chamber, said dosing space and injection chamber, intercommunicating with each other.

4. The injection molding machine of claim 1, in which the annular passage is situated between a cylindrical portion of the plasticizing plunger and the internal wall of the injection cylinder.

5. The injection molding machine of claim 3, in which said annular passage is situated between a conically tapering portion of the plasticizing plunger and the internal wall of the injection cylinder, said tapering portion, in the forward end position of the plasticizing plunger, fitting against a complementary tapering surface at the front end of the injection cylinder.

6. The injection molding machine of claim 1, in which the front side of the plasticizing plunger is provided with a cone surface and the rearside of the plunger is provided with an annular surface conically converging towards the plunger rod.

7. The injection molding machine of claim 3, in which the volume of said dosing space is adjustable by displacement of the dead center positions of the plasticising plunger.

8. The injection molding machine of claim 1, in which the plasticizing plunger comprises a cone-shaped head which is pierced by holes.

* * * * *